Aug. 21, 1934.   J. F. LINCOLN ET AL   1,971,074
CURRENT GENERATION FOR ARC WELDING AND THE LIKE
Filed April 14, 1931

INVENTORS
James F. Lincoln and
BY George G. Landis

Fay Oberlin & Fay
ATTORNEYS.

Patented Aug. 21, 1934

1,971,074

UNITED STATES PATENT OFFICE 1,971,074

CURRENT GENERATION FOR ARC WELDING AND THE LIKE

James F. Lincoln, East Cleveland, and George G. Landis, Euclid Village, Ohio, assignors to The Lincoln Electric Company, Cleveland, Ohio, a corporation of Ohio Application April 14, 1931, Serial No. 529,950

11 Claims. (Cl. 219—8)

This invention relates as indicated to current generation for electric arc-welding and the like and has specific reference to a method of and apparatus for supplying welding current to a plurality of welding arcs from a single source of supply such as a welding current generator.

Heretofore, it has been the practice, when supplying welding current to a plurality of arcs from a single source of supply, to generate the welding current at a constant potential of from 60 to 80 volts and then reduce such potential to the desired arc voltage which may be in the neighborhood of 18 volts by variable resistances in the welding circuit in series with each of the welding arcs. This method, however, is highly inefficient due to the fact that such resistances dissipate considerable energy which is not employed for any useful purpose.

It is among the objects of our invention to provide methods of and apparatus for generating and distributing arc welding current which shall be more efficient than any heretofore employed. Other objects of our invention will appear as the description proceeds.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
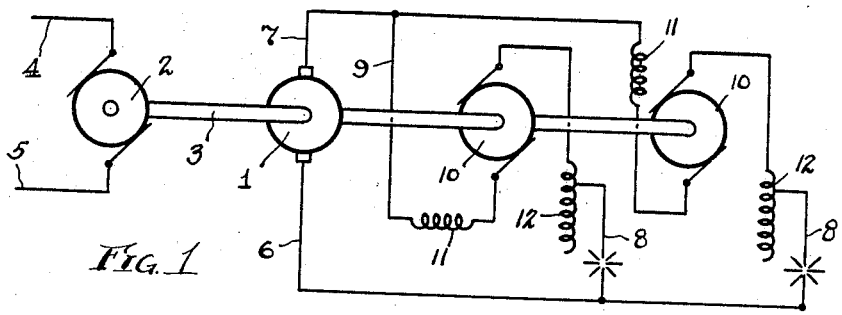
Figure 2:
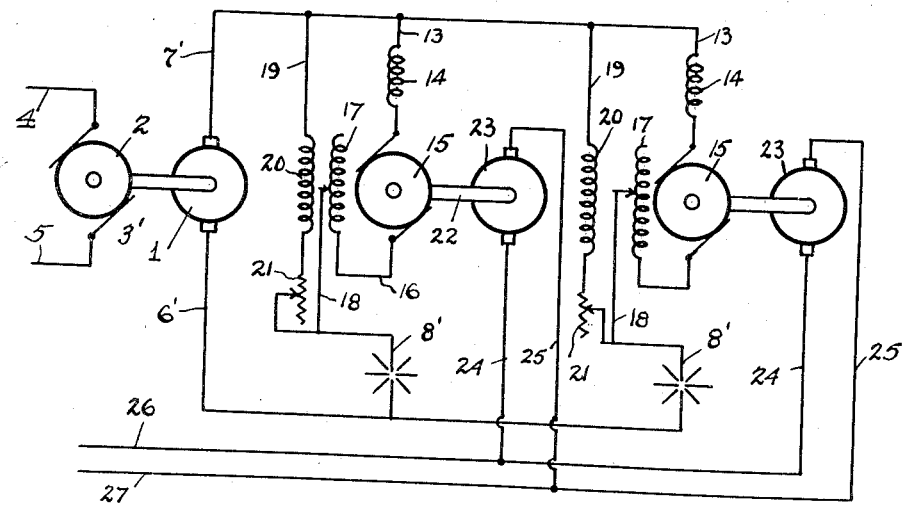

In said annexed drawing:

Fig. 1 is a diagrammatic representation of one form of apparatus which may be employed for the purpose of carrying forth the principles comprising our invention; Fig. 2 is likewise a diagrammatic representation showing an alternative arrangement of the mechanism illustrated in Fig. 1.

Referring now more specifically to the drawing and more especially to Fig. 1, it will be noted that we employ a motor generator set for generating the welding current which consists of a generator 1, a motor 2, said generator and motor being mounted on a shaft 3, and power leads 4 and 5 connected to the motor. One of the leads 6 from the welding current generator will be connected to the work in the well known manner. The other lead 7 from the welding current generator is connected to a welding electrode 8 adapted to be presented in arcing relation to the work through the means for regulating the arc voltage which will now be described.

A series motor 10 which has a lead 9 therefrom to the welding current lead 7, an interpole winding 11 and an adjustable series field 12, is connected in series with the welding arc 8. In the arrangement illustrated in this figure, such motor 10 is mechanically connected to the shaft of the welding current generator 1 so that it may assist the motor 2 in driving such generator. The motor 10 may be referred to as a rotary stabilizer but regardless of which form it takes, it will be a means in series with the welding arc which generates a counter E. M. F. in the welding circuit so as to adjustably regulate the arc voltage.

A separate rotary controller will be employed in series with each of the welding arcs so that the proper control of the voltage across such arcs may be had. By connecting the rotary stabilizers 10 to the shaft of the welding current generator, such motors or stabilizers will assist the motor 2 in driving the generator. The counter E. M. F. generated in the separate branches of the welding circuit by such motors or rotary stabilizers may be adjustably controlled by variations in the adjustable series field as is well known to those familiar with the art of motor control.

When the welding operations are to be performed at widely spaced points or at points considerably removed from the welding electrode, then instead of mechanically connecting the rotary stabilizers or motors to the welding current generator, such motors may be employed, as is most clearly illustrated in Fig. 2, to drive energy converting means such as electric current generators which may pump the power generated thereby either back into the power line for the motor in the motor-generator set or to any desired point of use.

The apparatus illustrated in Fig. 2 will now be briefly explained.

A motor-generator set for generating the welding current such as is illustrated in Fig. 1 will likewise be employed in this arrangement. The rotary stabilizers associated with each of the welding arcs are, however, slightly different than those illustrated in the previous figure. In the modification as illustrated in Fig. 2, the rotary stabilizer or motor 15 is connected in series with the welding arc by means of leads 13 and 18 and has an interpole winding 14 and an adjustable series field 17. The rotary stabilizer 15 likewise has a shunt field 20 which is connected to the lead 7' by the lead 19, and has an adjustable resistance 21 in series therewith.

The motor or rotary stabilizer 15 is connected by means of a shaft 22 to the electric current generator 23 which may be connected by means of leads 24 and 25 to a line 26 and 27.

This form of apparatus will, of course, preferably be duplicated for each welding arc although it is to be noted that the several rotary stabilizers such as 15 might be connected to a single generator such as 23 if the welding stations are close enough together to warrant such mechanical linkage.

When apparatus as hereinbefore described is employed, it may be advisable, due to the fact that under normal operating circumstances, the several welding arcs at the different welding stations are each maintained for only approximately one-half the total time of operation of the apparatus, to provide a smaller number of counter E. M. F. generating means, such as 15 and 10, than there are welding stations. If this scheme is employed, some automatic switch mechanism will, of course, be necessary so that as soon as a particular arc is initiated, such switching mechanism will connect the particular operating circuit to the main supply circuit through one set of apparatus, the selected apparatus, of course, being determined by the number of welding stations which are in operation.

A further description of the principles comprising our invention is believed unnecessary for those familiar with the art. Suffice it to say that numerous changes might be made in the particular form of apparatus herein disclosed and described and the manner of the control of such apparatus without departing from the principles comprising our invention.

Other modes of applying the principles of our invention may be employed instead of the one explained, change being made as regards the means and steps herein disclosed, provided those stated by any of the following claims or their equivalent be employed.

We therefore particularly point out and distinctly claim as our invention:—

1. The combination with an electric arc welding circuit, of a constant speed electric motor in series with said circuit.

2. The combination with an electric arc welding circuit, of means for generating a counter E. M. F. in said circuit, said means comprising a constant speed electric motor in series with said circuit.

3. The combination with an electric arc welding circuit, of a constant speed motor in said circuit, said motor having a variable series field.

4. The combination with an electric arc welding circuit, of a constant speed motor in said circuit, said motor having a variable shunt field.

5. The combination with an electric arc welding circuit, of a constant speed motor in said circuit, said motor having series and shunt fields.

6. The combination with an electric arc welding circuit, of a constant speed motor in said circuit, said motor having a shunt field which is excited only during the time the welding arc is maintained.

7. The combination with an electric arc welding circuit comprising a plurality of welding electrodes connected in parallel, and a motor in series with each of such electrodes, said motors mechanically interconnected.

8. The combination with an electric arc welding circuit, of a constant speed welding current generator, and a motor connected in series in the welding circuit and mechanically connected to said generator to assist in driving the same.

9. In electric arc welding apparatus, the combination with a single main welding current generator, of a plurality of welding arc circuits connected in parallel with said generator, compound motors having their series field and armature winding connected in series with said arcs, and electric current generating means driven by said motors.

10. In electric arc welding apparatus, the combination with a single main welding current generator, of a plurality of welding arc circuits connected in parallel with said generator, compound motors having variable fields and respectively connected in said arc circuits, and electric current generating means driven by said motors.

11. In electric arc welding apparatus, the combination with a single main welding current generator, of a plurality of welding arc circuits connected in parallel with said generator, compound motors having variable shunt fields and respectively connected in series with said arc circuits, and electric current generating means driven by said motors.

JAMES F. LINCOLN.
GEORGE G. LANDIS.